(12) United States Patent
Huntzicker et al.

(10) Patent No.: US 9,110,772 B2
(45) Date of Patent: Aug. 18, 2015

(54) MOBILE DEVICE-ACTIVATED VEHICLE FUNCTIONS

(71) Applicant: GM Global Technology Operations LLC, Detroit, MI (US)

(72) Inventors: Fred W. Huntzicker, Ann Arbor, MI (US); Ansaf I. Alrabady, Livonia, MI (US); Neeraj R. Gautama, Whitby (CA); Jarvis Chau, Toronto (CA); Amanda J. Kalhous, Ajax (CA)

(73) Assignee: GM Global Technology Operations LLC, Detroit, MI (US)

( * ) Notice: Subject to any disclaimer, the term of this patent is extended or adjusted under 35 U.S.C. 154(b) by 248 days.

(21) Appl. No.: 13/672,080

(22) Filed: Nov. 8, 2012

(65) Prior Publication Data

US 2014/0129054 A1    May 8, 2014

(51) Int. Cl.
*G06F 7/00* (2006.01)
*G06F 17/00* (2006.01)
*B60R 25/24* (2013.01)

(52) U.S. Cl.
CPC ............... *G06F 17/00* (2013.01); *B60R 25/24* (2013.01)

(58) Field of Classification Search
CPC    G07C 5/008; B60R 25/24; F16H 2061/0081; F02N 11/0807; B60W 2050/0057
USPC ............. 701/2, 36, 57; 340/5.2, 5.6, 5.61, 5.8
See application file for complete search history.

(56) References Cited

U.S. PATENT DOCUMENTS

| | | | |
|---|---|---|---|
| 2004/0002354 A1* | 1/2004 | Nagano ..................... | 455/550.1 |
| 2009/0075592 A1 | 3/2009 | Nystrom et al. | |
| 2009/0261945 A1* | 10/2009 | Ko et al. ..................... | 340/5.61 |
| 2010/0231354 A1* | 9/2010 | Nishiguchi et al. ............ | 340/5.8 |
| 2010/0253535 A1* | 10/2010 | Thomas et al. .......... | 340/825.24 |
| 2010/0305779 A1* | 12/2010 | Hassan et al. ..................... | 701/2 |
| 2012/0235636 A1 | 9/2012 | Partovi | |
| 2012/0299538 A1* | 11/2012 | Arai et al. ..................... | 320/108 |
| 2012/0330514 A1* | 12/2012 | Proefke et al. .................. | 701/49 |
| 2013/0342379 A1* | 12/2013 | Bauman et al. ................. | 342/21 |
| 2014/0285319 A1* | 9/2014 | Khan et al. ................... | 340/5.61 |

OTHER PUBLICATIONS

German Office Action issued Feb. 27, 2015 in corresponding German Application No. 102013222332.3.

* cited by examiner

*Primary Examiner* — Mary Cheung
(74) *Attorney, Agent, or Firm* — Cantor Colburn LLP

(57) ABSTRACT

Mobile device-activated vehicle functions are implemented by authenticating a vehicle with a device via wireless signals transmitted between a low frequency antenna of the device and a low frequency antenna of the vehicle when the vehicle is in communicative range of the device. The mobile device-activated vehicle functions are further implemented by receiving, via computer processor embedded in the device, a selection from one of a plurality of input components embedded in the device, the selection associated with a vehicle function, and transmitting a request to implement the vehicle function via the low frequency antenna coupled to the computer processor and the low frequency antenna of the vehicle.

14 Claims, 2 Drawing Sheets

MOBILE DEVICE-ACTIVATED VEHICLE FUNCTIONS

FIELD OF THE INVENTION

The subject invention relates to vehicle access and, more particularly, to mobile device-activated vehicle functions.

BACKGROUND

With the increased popularity of mobile communications devices, such as cellular telephones and smart phones, many individuals state they are more likely to forget their car keys and other electronic devices than they are to forget their mobile communications devices.

With the advent of wireless technology, many vehicle functions can now be implemented using a key fob that is programmed to perform remote functions with respect to the vehicle. However, keeping track of multiple key fobs and other electronic devices, such as mobile communications device and music players, etc., can be a difficult task.

Accordingly, it is desirable to provide a way to integrate features of various electronic devices to a single device.

SUMMARY OF THE INVENTION

In one exemplary embodiment of the invention a system is provided. The system includes a computer processor embedded in a device and input components embedded in the device. The input components are communicatively coupled to the computer processor. The system also includes a low frequency antenna communicatively coupled to the computer processor and logic executable by the computer processor. The logic is configured to implement a method. The method includes authenticating a vehicle with the device via wireless signals transmitted between the low frequency antenna and a low frequency antenna of the vehicle when the vehicle is in communicative range of the device. The method also includes receiving a selection from one of the input components. The selection is associated with a vehicle function. The method further includes transmitting a request to implement the vehicle function via the low frequency antenna coupled to the computer processor and the low frequency antenna of the vehicle.

In another exemplary embodiment of the invention, a method is provided. The method includes authenticating a vehicle with a device via wireless signals transmitted between a low frequency antenna of the device and a low frequency antenna of the vehicle when the vehicle is in communicative range of the device. The method also includes receiving, via computer processor embedded in the device, a selection from one of a plurality of input components embedded in the device. The selection is associated with a vehicle function. The method further includes transmitting a request to implement the vehicle function via the low frequency antenna coupled to the computer processor and the low frequency antenna of the vehicle.

In yet another exemplary embodiment of the invention, a computer program product is provided. The computer program product includes a storage medium embedded with computer instructions, which when executed by a computer processor embedded in a device, causes the computer processor to implement a method. The method includes authenticating a vehicle with the device via wireless signals transmitted between a low frequency antenna of the device and a low frequency antenna of the vehicle when the vehicle is in communicative range of the device. The method also includes receiving a selection from one of a plurality of input components embedded in the device. The selection is associated with a vehicle function. The method further includes transmitting a request to implement the vehicle function via the low frequency antenna coupled to the computer processor and the low frequency antenna of the vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

In accordance with an exemplary embodiment of the invention, vehicle functions and communications are provided. The vehicle functions and communications enable a user of a mobile communications device to implement various vehicle functions, such as authentication, passive entry passive start (PEPS), wireless charging of the mobile communications device in the vehicle, and the tracking of location data. The mobile communications device is equipped with a peripheral device, such as a case or sleeve that has embedded circuitry for implementing the vehicle functions and communications described herein. While the vehicle functions and communications are described herein with respect to a peripheral device that is comprised of a case or a sleeve, it will be understood that other means of implementing the vehicle functions and communications may be employed. For example, a mini or micro secure digital (SD) card or memory device embedded in the mobile communications device may be programmed to implement the exemplary functions described herein.

Figure 1:
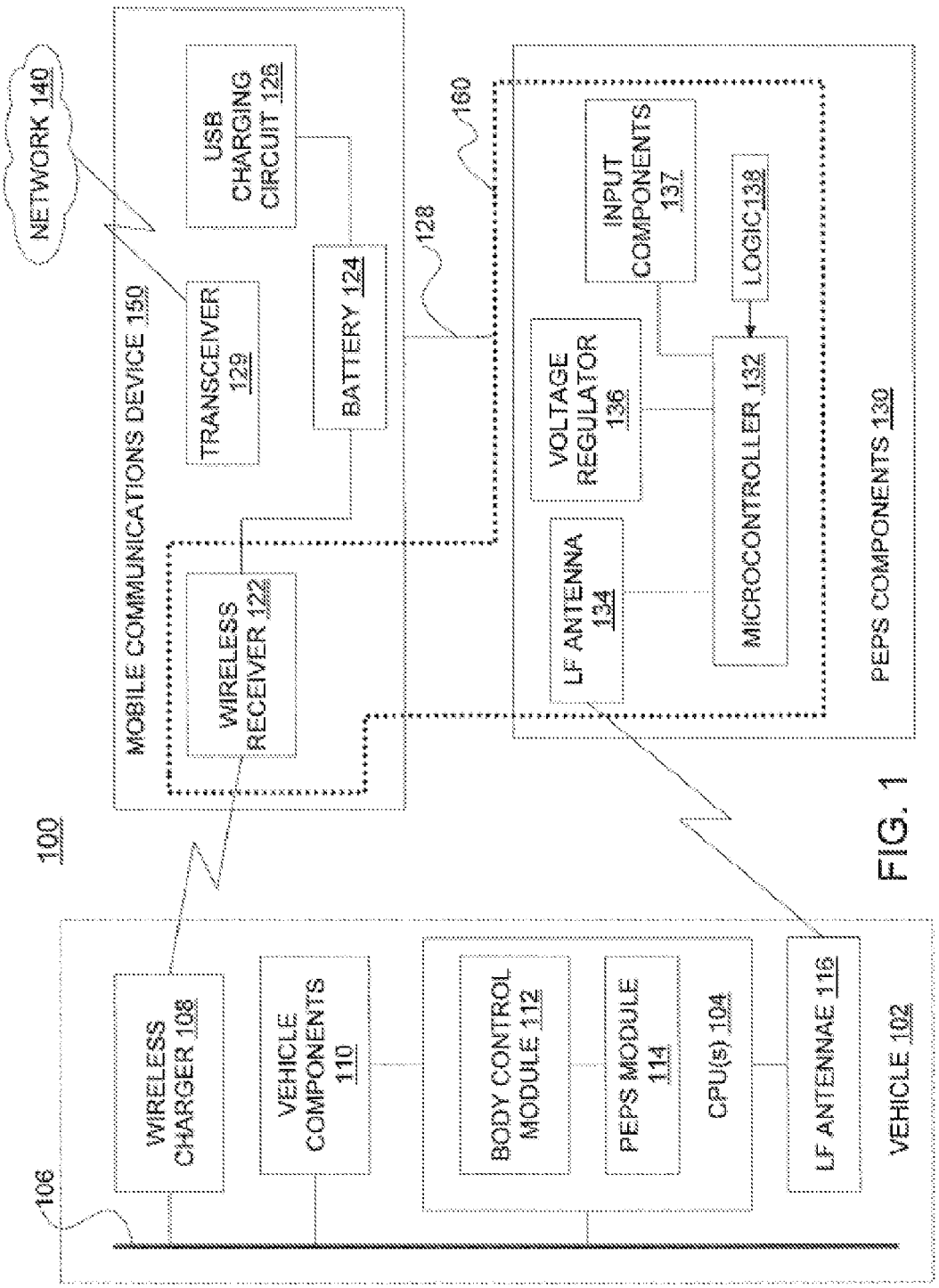
FIG. 1 is a block diagram of a system upon which vehicle functions and communications via a mobile communications device may be implemented in an embodiment.

The system 100 of FIG. 1 includes a portion of a vehicle 102 and a mobile communications device 150. The vehicle 102 may be any type of automobile, truck, utility vehicle, van, etc., known in the art. The mobile communications device 150 may be a cellular telephone or smart phone. The mobile communications device 150 may be owned or operated by an occupant or operator of the vehicle 102.

The vehicle 102 includes one or more computer processing units (CPUs) 104, a wireless charger 108, and vehicle components 110, each of which is communicatively coupled to a network bus 106.

The CPUs 104 are implemented in hardware, such as processor cores, registers, caches, decoders, and instruction execution units, to name a few. The CPUs 104 may form part of the vehicle's 102 central control system.

The wireless charger 108 includes a magnetic inductive charging unit (e.g., Powermat®) that is coupled to the vehicle's bus 106 or may include its own power source. The wireless charger 108 wirelessly transmits electrical power to the mobile communications device 150, as will be described further herein.

The vehicle components 110 may include any systems, devices, or elements of the vehicle 102 under the operational control of the CPUs 104. Non-limiting examples of the vehicle components 110 include a vehicle ignition, power locks, power windows, power mirrors, and vehicle lighting.

The network bus 106 may be implemented as a wireline network or wireless network. In one embodiment, the network bus 106 is implemented as a serial data bus that forms part of a local area network of the vehicle 102.

The CPU(s) 104 execute a body control module (BCM) 112 and a passive entry passive start (PEPS) module 114 for managing the operation of the components 110, such as remote lock and unlock, remote start, power windows and mirrors, power locks, and lighting systems. The BCM 112 and PEPS module 114 may be implemented as logic that is stored in a memory location of the vehicle 102 and executed by the CPU(s) 104 as described further herein.

The vehicle 102 also includes low frequency (LF) antennae 116 that are dispersed around the interior and/or exterior portions of the vehicle 102. The low frequency antenna 116 may be radio frequency antenna configured to communicate wirelessly using a pre-defined communication protocol, such as Bluetooth™ or other communication protocol, such as WiFi. The low frequency antennae 116 receive and transmit communications to the mobile communications device 150, which communications are facilitated via the body control module 112 and the PEPS module 114. These communications include authentication of external devices, such as the mobile communications device 150, PEPS functions, and other information as described further herein.

In an embodiment, the mobile communications device 150 includes a wireless receiver 122, a battery 124, a universal serial bus (USB) charging circuit 126, and a transceiver 129. The wireless receiver 122 and the USB charging circuit 126 may each be coupled to the battery 124 via discrete wiring.

The wireless receiver 122 may be built into the mobile communications device 150 during the manufacturing process or may be fitted with the mobile communications device 150 as an aftermarket feature. For example, the wireless receiver 122 may be built into a sleeve or case 160 that couples with the mobile communications device 150 when the mobile communications device 150 is placed in the sleeve or case 160.

The battery 124 may be a standard lithium ion battery configured for use in cellphones and smart phones. The USB charging circuit 126 may include a built in port and circuitry in the mobile communications device 150 for receiving a USB cable that is coupled to an external power source. Thus, the battery 124 may be charged wirelessly through the wireless receiver 122 or through a wired connection via the USB charging circuit 126. The transceiver 129 includes communication components for enabling the mobile communications device 150 to communicate over one or more networks. As shown in FIG. 1, the mobile communications device 150 is communicatively coupled to a network 140 via the transceiver 129. A user of the mobile communications device 150 initiates and receives communications over the network 140, which may be a cellular network.

Also shown in FIG. 1 are PEPS components 130. The PEPS components 130 include a microcontroller 132, a low frequency antenna 134, a voltage regulator 136, input components 137, and logic 138. The microcontroller 132 may be implemented on an integrated circuit that includes a processor core, memory, and programmable input/output elements. The microcontroller 132 executes the logic 138 for implementing various features and functions described herein.

The low frequency antenna 134 may be a radio frequency antenna configured to communicate wirelessly using a pre-defined communication protocol, such as Bluetooth™. In an embodiment, the low frequency antenna 134 communicates with the low frequency antennae 116 in order to authenticate the mobile communications device 150 with the vehicle 102 and enable the mobile communications device 150, once authenticated, to direct various vehicle functions, such as PEPS functions.

The voltage regulator 136 stabilizes the voltage used by the microcontroller 132 and other elements of the mobile communications device 150. In an embodiment, the voltage regulator 136 cuts off power to the PEPs components 130 once the battery 124 has reached critical levels to reduce the incidence of battery drain that may otherwise occur.

The input components 137 may be buttons or other elements that are coupled to the microcontroller 132 and receive input selections from a user of the mobile communications device 150, which input selections are configured to direct the microcontroller 132 to perform a designated function.

The PEPS components 130 may be built into the mobile communications device 150 during manufacture or may be provided as an aftermarket event. For example, the PEPS components 130 may be embedded in a sleeve or case that couples with the mobile communications device 150 when the mobile communications device 150 is placed in the sleeve. As shown in FIG. 1 for purposes of illustration, the PEPS components 130 are embedded in the sleeve or case 160. The sleeve or case 160 may be communicatively coupled to the mobile communications device via a cable or wiring 128 (e.g., a serial data bus or optical connection) or may be a wireless connection implemented through a wireless node (e.g., via near field communications (NFC) technology).

In operation, when an individual approaches the vehicle 102 with the mobile communications device 150, the LF antennae 116 within range of the mobile communications device 150 enables the device 150 to authenticate itself to the PEPS module 114 via a wireless signal. Upon successful authentication, the PEPS module 114, in cooperation with the BCM 112 performs the appropriate PEPS function (e.g., remote lock and unlock, remote start, power door activation, power tailgate/decklid activation, panic, and other functions that might be triggered using the mobile communications device 150). In an embodiment, a user selects an input component 137 that is associated with a particular PEPS function (e.g., unlock door) and the microcontroller 132 transmits a request to the PEPS module 114 via the respective LF antennae 134 and 116. The PEPS module 114, in turn, directs the BCM 112 to transmit a corresponding signal over the bus 106 to the appropriate vehicle component 110.

In another embodiment, authentication of the device 150 may be initiated when the device 150 is placed on the wireless charger 108. In this embodiment, a power charging status of the wireless charger 108, which is indicative of the device's 150 presence on the wireless charger 108, is used to begin the authentication process. Additionally, other functions may be implemented using the power charging status, such as automatic activation of the vehicle (e.g., ignition on), door locking, and transfer of content from the mobile communications device 150 (e.g., music, contacts, destinations/routes, updates to vehicle telematics system, etc.) to the vehicle.

Additionally, the wireless receiver 122 of the mobile communications device 150 (either embedded therein, or communicatively coupled thereto via the sleeve or case 160) enables the battery 124 of the mobile communications device 150 to be wirelessly charged when in contact with the wireless charger 108.

In an embodiment, the logic 138 of the PEPS components 130 may be configured to revoke or suspend use of the vehicle functions and communications described herein in response to instructions received over the network 140 (e.g., from the cellular telephone service provider when the customer notifies the provider that his/her cellular telephone is lost).

Figure 2:
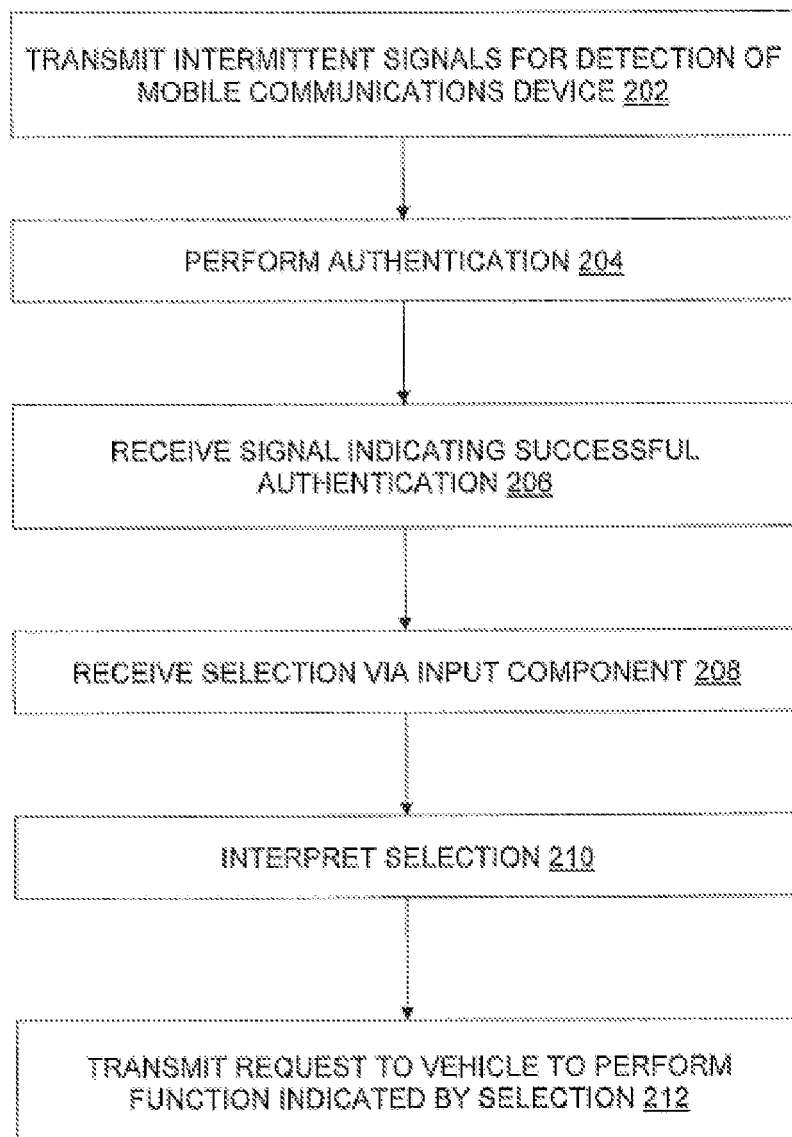
FIG. 2 is a flow diagram of a process for implementing vehicle functions and communications via a mobile communications device in an embodiment.

Turning now to FIG. 2, a process for implementing the vehicle functions and communications will now be described in an embodiment. The process described in FIG. 2 assumes that a user of the mobile communications device 150 has entered an area that is in communicative range of the vehicle 102.

At step 202, the LF antennae 116 detect the presence of the mobile communications device 150, e.g., via intermittent signals transmitted by the LF antenna 134.

At step 204, an authentication process is performed between the vehicle 102 and the mobile communications device 150. This may be implemented using standard Bluetooth authentication protocols. In an embodiment, a unique identifier may be programmed into the memory of the microcontroller 132 that identifies the vehicle 102, such that the vehicle 102 receives the identifier from the mobile communications device 150 during the authentication process, and the vehicle 102 matches the identifier from the mobile communications device 150 to its own identifier.

At step 206, the microcontroller 132 receives a response signal from the vehicle 102, and the logic 138 determines whether the response indicates a successful authentication or whether the authentication process was unsuccessful.

Once successfully authenticated, the user selects an input component 137 associated with a PEPS function at step 208, which is interpreted by the logic 138 at step 210, and the microcontroller 132 transmits a corresponding signal to the vehicle 102 via the LF antennae 134 and 116, respectively at step 212. The CPU(s) 104 receives the signal, which is interpreted by the PEPS module 114. The PEPS module 114 initiates the corresponding PEPS function with respect to the vehicle components 110 as described above.

The exemplary vehicle functions and communications have widespread applications. In one embodiment, a vehicle rental service may employ the vehicle functions and communications to enable quick and easy access to rental vehicles. For example, if the PEPS components 130 are built into a case or sleeve 160, the unique identifier of the vehicle 102 can be programmed into the microcontroller 132, which can then be presented to a rental customer for use on his/her mobile communications device. In this manner, the rental customer can activate PEPS features with his/her own mobile phone. The vehicle rental service no longer requires key fobs for each vehicle it services. In another embodiment of the vehicle rental service, the vehicle identifier can be transmitted over a network (e.g., cellular network) before the rental customer is present at the premises of the vehicle rental service location. In this example, the rental customer engages in a rental agreement over the phone or by computer web site, and the vehicle rental service electronically provides the vehicle identifier, vehicle make, and parking location of the vehicle. The rental customer can then bypass the process of checking in at a service counter and walk directly to the rental vehicle at the stated location. In addition, the logic 138 of the PEPS components 130 may be configured to revoke or suspend use of the vehicle functions and communications described herein in response to instructions received over the network 140 (e.g., from the vehicle rental service when the rental period is over or the customer notifies the vehicle rental service that his/her cellular telephone is lost).

With respect to the vehicle rental service application of the vehicle functions and communications, the vehicle rental service may also track information about the rental activities, such as routes taken and current location. In an embodiment, the location information may be transmitted through the mobile communications device 150 via the transceiver 129 over the network 140 to the vehicle rental service. The location information may be derived from data transmitted between the mobile communications device 150 and cellular towers in the vicinity of the vehicle 102.

The location information derived from the mobile communications device 150 may also be used to match up with location information derived from a navigation device of the vehicle 102 in order to provide security and prevent communications derived from external sources (e.g., man-in-the-middle attacks).

In addition, authentication between a vehicle 102 and the mobile communications device 150 may be initiated using location information derived from the transceiver 129 that informs the vehicle 102 that the mobile communications device 150 is within range.

Technical effects of the vehicle functions and communications enable a user of a mobile communications device to implement various vehicle functions, such as authentication, passive entry passive start, wireless charging of the mobile communications device in the vehicle, and the tracking of location data. The mobile communications device is equipped with a peripheral device, such as a case or sleeve that has embedded circuitry for implementing the vehicle functions and communications described herein.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system, comprising:
  a case configured to receive a mobile communications device, wherein the case is embedded with circuitry powered by a battery disposed in the mobile communications device, the circuitry configured to authenticate a vehicle and comprising:
a computer processor;
a low frequency antenna;
input components communicatively coupled to the computer processor, and wherein the circuitry defines a wireless receiver that, in conjunction with a wireless charger of the vehicle, is configured to inductively charge the battery when the wireless receiver is in physical contact with the wireless charger; and
logic executable by the computer processor, the logic configured to implement a method, the method comprising:
authenticating the vehicle with the circuitry via wireless signals transmitted between the low frequency antenna and a low frequency antenna of the vehicle when the vehicle is in communicative range of the circuitry;
receiving a selection from one of the input components, the selection associated with a vehicle function; and
transmitting a request to implement the vehicle function via the low frequency antenna coupled to the computer processor and the low frequency antenna of the vehicle.

2. The system of claim 1, wherein the vehicle function is a passive entry passive start function.

3. The system of claim 2, wherein the passive entry passive start function is at least one of:
remote locking of a door;
remote unlocking of a door;
remote starting of vehicle engine;
remote activation of lights; and
remote activation of power windows.

4. The system of claim 1, wherein the logic is further configured to implement programming a unique identifier to a memory of the computer processor, the unique identifier associated with the vehicle and the logic uses the unique identifier to authenticate the vehicle with the circuitry.

5. A method, comprising:
authenticating a vehicle with circuitry via wireless signals transmitted between a low frequency antenna of the circuitry and a low frequency antenna of the vehicle when the vehicle is in communicative range of the circuitry;
embedding the circuitry in a case that is configured to receive a mobile communications device;
communicatively coupling the case with the mobile communications device, via a coupling element, when the mobile communications device is placed in the case, the circuitry is powered by a battery disposed in the mobile communications device;
inductively charging the battery, via a wireless receiver embedded in the case in conjunction with a wireless charger of the vehicle, when the wireless receiver is in physical contact with the wireless charger;
receiving, via computer processor embedded in the circuitry, a selection from one of a plurality of input components embedded in the device, the selection associated with a vehicle function; and
transmitting a request to implement the vehicle function via the low frequency antenna coupled to the computer processor and the low frequency antenna of the vehicle.

6. The method of claim 5, wherein the vehicle function is a passive entry passive start function.

7. The method of claim 6, wherein the passive entry passive start function is at least one of:
remote locking of a door;
remote unlocking of a door;
remote starting of vehicle engine;
remote activation of lights; and
remote activation of power windows.

8. The method of claim 5,
wherein the coupling element includes at least one of physical wiring and a wireless node.

9. The method of claim 5, further comprising:
programming a unique identifier into a memory of the computer processor, wherein the unique identifier associated with the vehicle and the computer processor uses the unique identifier to authenticate the vehicle with the circuitry.

10. A computer program product comprising a storage medium embodied with computer instructions, which when executed by a computer processor embedded in circuitry, causes the computer processor to implement a method, the method comprising:
authenticating a vehicle with the circuitry via wireless signals transmitted between a low frequency antenna of the circuitry and a low frequency antenna of the vehicle when the vehicle is in communicative range of the circuitry;
embedding the circuitry in a case that is configured to receive a mobile communications device;
communicatively coupling the case with the mobile communications device, via a coupling element, when the mobile communications device is placed in the case, the circuitry is powered by a battery disposed in the mobile communications device;
inductively charging the battery, via a wireless receiver embedded in the case in conjunction with a wireless charger of the vehicle, when the wireless receiver is in physical contact with the wireless charger;
receiving a selection from one of a plurality of input components embedded in the circuitry, the selection associated with a vehicle function; and
transmitting a request to implement the vehicle function via the low frequency antenna coupled to the computer processor and the low frequency antenna of the vehicle.

11. The computer program product of claim 10, wherein the vehicle function is a passive entry passive start function.

12. The computer program product of claim 11, wherein the passive entry passive start function is at least one of:
remote locking of a door;
remote unlocking of a door;
remote starting of vehicle engine;
remote activation of lights; and
remote activation of power windows.

13. The computer program product of claim 10,
wherein the coupling element includes at least one of physical wiring and a wireless node.

14. A system, comprising:
a case configured to receive a mobile communications device, wherein the case is embedded with circuitry powered by a battery disposed in the mobile communications device, the circuitry configured to authenticate a vehicle and comprising:
a computer processor;
a low frequency antenna;
input components communicatively coupled to the computer processor; and
logic executable by the computer processor, the logic configured to implement a method, the method comprising:
authenticating the vehicle with the circuitry via wireless signals transmitted between the low frequency antenna and a low frequency antenna of the vehicle when the vehicle is in communicative range of the circuitry;
receiving a selection from one of the input components, the selection associated with a vehicle function; and
transmitting a request to implement the vehicle function via the low frequency antenna coupled to the computer processor and the low frequency antenna of the vehicle.

* * * * *